United States Patent
Cook et al.

(10) Patent No.: US 11,270,032 B1
(45) Date of Patent: Mar. 8, 2022

(54) TAMPER SWITCH ASSEMBLY AND INSTALLATION METHOD THEREOF

(71) Applicant: THALES E-SECURITY, INC., Plantation, FL (US)

(72) Inventors: Timothy E. Cook, Coral Springs, FL (US); Gerald Thomas Wardrop, Coral Springs, FL (US); Gary M. Angelone, Pembroke Pines, FL (US)

(73) Assignee: THALES E-SECURITY, INC., Plantation, FL (US)

( * ) Notice: Subject to any disclaimer, the term of this patent is extended or adjusted under 35 U.S.C. 154(b) by 222 days.

(21) Appl. No.: 16/726,354

(22) Filed: Dec. 24, 2019

Related U.S. Application Data

(60) Provisional application No. 62/785,334, filed on Dec. 27, 2018.

(51) Int. Cl.
*G06F 21/86* (2013.01)

(52) U.S. Cl.
CPC .................. *G06F 21/86* (2013.01)

(58) Field of Classification Search
CPC ........... G08B 1/08; G08B 21/00; H04L 29/06; G06K 19/00; G06K 7/10; G06K 7/10277; H05B 33/00; G06F 21/00; G06F 21/86; D06F 33/02; D06F 37/00; D06F 37/42
See application file for complete search history.

(56) References Cited

U.S. PATENT DOCUMENTS

| 4,066,857 | A |   | 1/1978  | Suska |
|-----------|---|---|---------|-------|
| 5,520,026 | A | * | 5/1996  | Ackland ................. D06F 37/42 68/12.26 |
| 5,680,095 | A |   | 10/1997 | Nassouri |
| 6,083,246 | A |   | 7/2000  | Stendahl et al. |
| 7,004,784 | B2 |  | 2/2006  | Castle |
| 7,475,474 | B2 |  | 1/2009  | Heitmann et al. |
| 7,791,484 | B2 |  | 9/2010  | Commagnac et al. |
| 7,903,659 | B2 | * | 3/2011 | Sindhu ..................... H04L 29/06 370/392 |
| 8,238,354 | B2 | * | 8/2012 | Bossemeyer, Jr .. H04L 12/2889 370/401 |
| 8,595,513 | B2 |   | 11/2013 | Adjedj |

(Continued)

FOREIGN PATENT DOCUMENTS

| EP | 2350910 B1 | 11/2009 |
|----|------------|---------|
| GB | 2318657 A  | 7/1997  |

(Continued)

*Primary Examiner* — Thanhnga B Truong
(74) *Attorney, Agent, or Firm* — Sage Patent Group

(57) ABSTRACT

A Tamper Switch Assembly to protect cryptographic modules and electronic components within a closeable unit. The Tamper Switch Assembly includes a Lid Switch Actuator affixable to an underside of a lid of the closeable unit, and a Lid Switch Guard Bracket affixable within a chassis of the closeable unit. The Tamper Switch Assembly includes an Electronic Switch Assembly insertable within the Lid Switch Guard Bracket to provide electrical monitoring of a switch state. A microprocessor is coupled to the Electronic Switch Assembly by communication means to monitor the switch for electrical continuity to determine its state, and in response, determine whether a tampering of the securely closed unit has occurred. Other embodiments are disclosed.

3 Claims, 14 Drawing Sheets

(56) References Cited

U.S. PATENT DOCUMENTS

| | | |
|---|---|---|
| 8,595,858 B2 | 11/2013 | Sakai |
| 8,613,111 B2 | 12/2013 | Condorelli et al. |
| 8,694,781 B1 | 4/2014 | Griffin et al. |
| 9,071,446 B2 | 6/2015 | Kreft |
| 9,461,826 B2 | 10/2016 | Kreft |
| 9,871,324 B2 | 1/2018 | Smith et al. |
| 9,892,293 B1 | 2/2018 | Wade et al. |
| 9,893,898 B2 | 2/2018 | Kreft |
| 10,007,811 B2 | 6/2018 | Sion |
| 10,127,409 B1 | 11/2018 | Wade |
| 10,171,251 B2 | 1/2019 | Kreft |
| 10,171,498 B2 | 1/2019 | Bartley et al. |
| 2004/0124980 A1 | 7/2004 | Sisson et al. |
| 2010/0031064 A1 | 2/2010 | Walmsley |
| 2013/0312122 A1 | 3/2014 | Arora |

FOREIGN PATENT DOCUMENTS

| | | |
|---|---|---|
| WO | WO2002077778 | 10/2002 |
| WO | WO2012021217 | 2/2012 |

\* cited by examiner

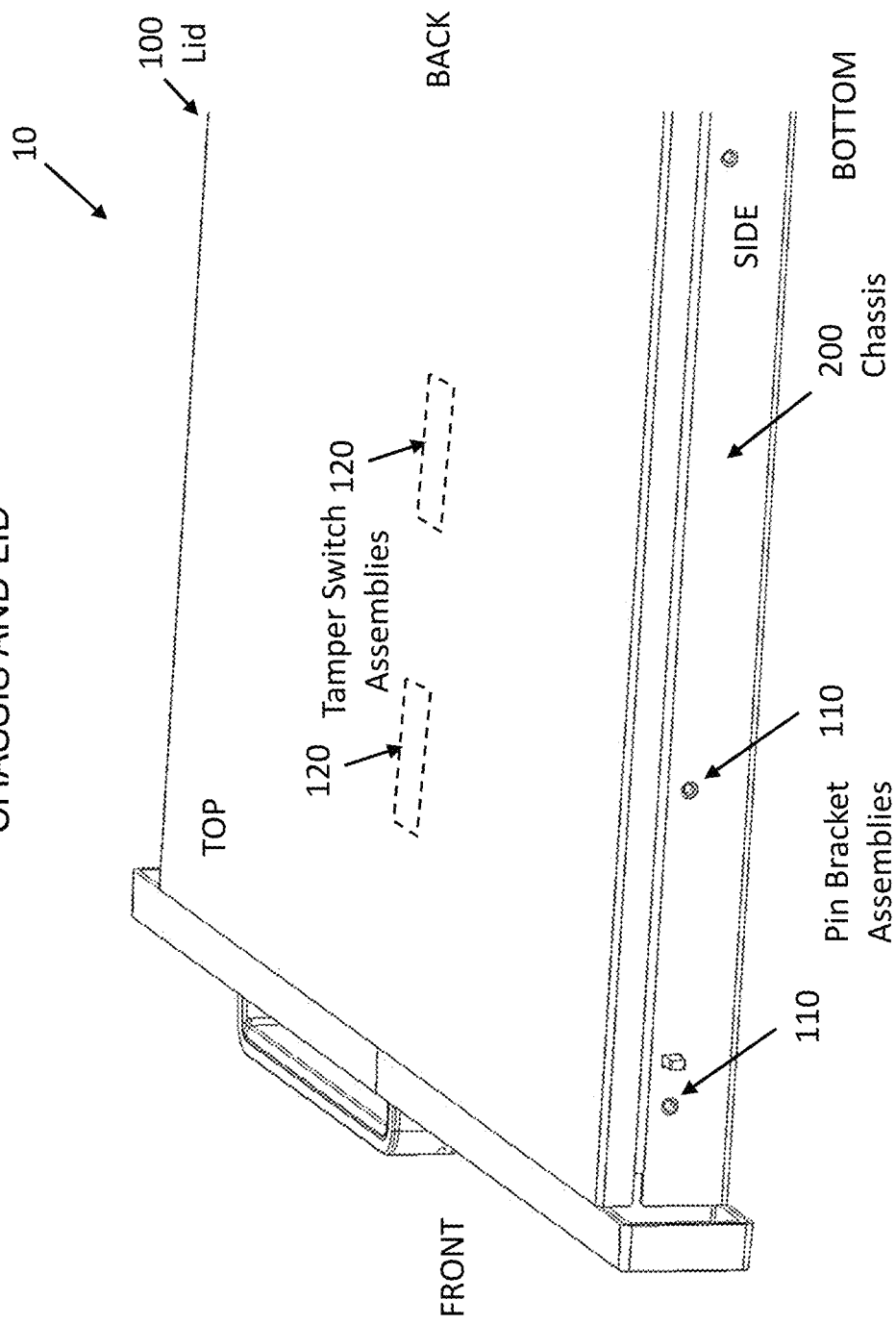

LID COMPONENTS
(TOP)

Inverted View to show Flange

Inverted View to show hook

CHASSIS COMPONENTS (BOTTOM)

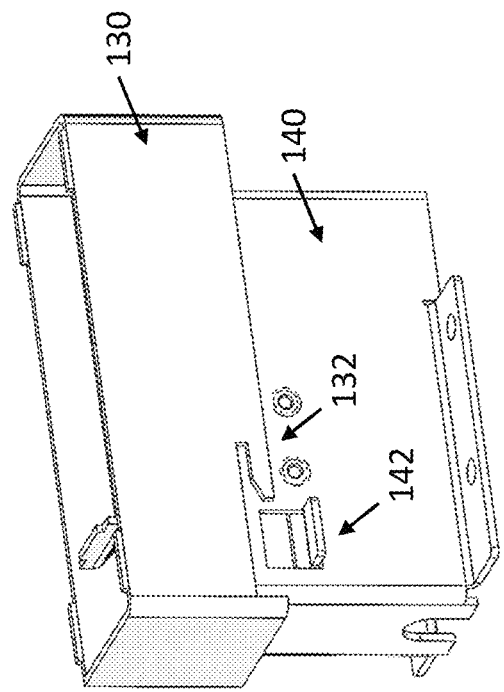

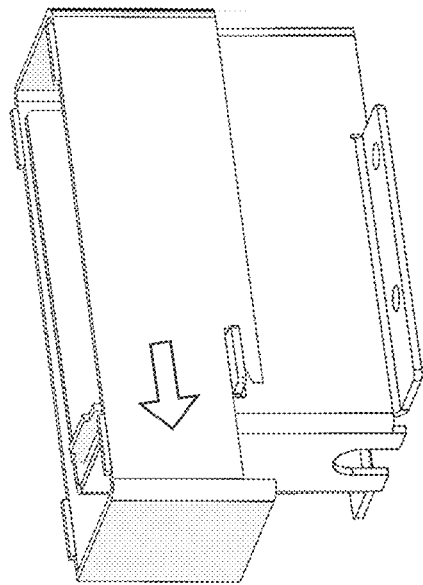

ELECTRONIC SWITCH ASSEMBLY
WITHIN GUARD BRACKED

ELECTRONIC SWITCH ASSEMBLY WITHIN GUARD BRACKED

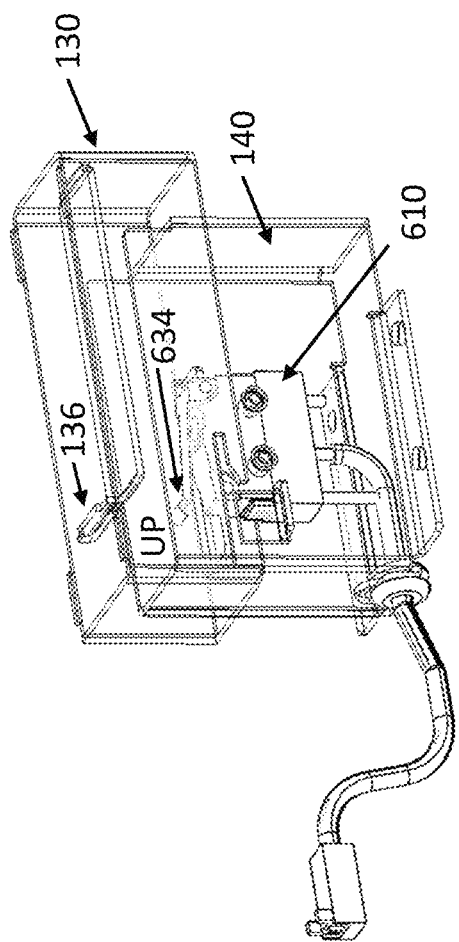

CONFIGURATION STATE
SLIDE LID TO FRONT

TAMPER SWITCH ASSEMBLY AND INSTALLATION METHOD THEREOF

BACKGROUND

The level of physical security required in cryptography products continues to increase. Moreover, meeting the rigorous security requirements of established certification bodies is becoming more difficult using only currently deployed technologies. Achieving security certification requires manufacturers to electronically detect and provide objective evidence whenever unauthorized access is made to protected cryptography modules and other electronic components within a chassis. Various protection schemes have been proposed to detect lid penetration and around protected components under the lid within the chassis, and provide a monitoring system with circuitry that generates an alert signal if access to the underlying components of the chassis which the lid protects is breached. One limitation of simple switch based schemes is that the lids are susceptible to manipulation that allows the supposedly protected components to be accessed without triggering an alert signal from the monitoring switches.

SUMMARY

One embodiment of the present disclosure is directed to a Tamper Switch Assembly to protect cryptographic modules and electronic components within a closeable unit. The Tamper Switch Assembly includes a Lid Switch Actuator affixed to an underside of a lid of the closeable unit, and a Lid Switch Guard Bracket affixed within a chassis of the closeable unit. The Tamper Switch Assembly includes an Electronic Switch Assembly inserted within the Lid Switch Guard Bracket to provide electrical monitoring of a switch state. By way of an installation procedure that closes the lid on the chassis of the closeable unit, the Lid Switch Actuator of the lid inserts down and over the Lid Switch Guard Bracket of the chassis and slides forward to engage the Electronic Switch Assembly. The installation procedure is a three step process (align, press down, slide forward) that prepares the closed unit for active tamper monitoring. A microprocessor is coupled to the Electronic Switch Assembly by communication means to monitor the switch for electrical continuity to determine its state, and in response, determine a tampering of the securely closed unit.

BRIEF DESCRIPTION OF THE DRAWINGS

Other features of embodiments will be more readily understood from the following detailed description of specific embodiments thereof when read in conjunction with the accompanying drawings, in which:

FIG. 1 illustrates an exemplary cryptographic unit configured by way of security mechanisms to detect tampering of protected electronics in accordance with some embodiments;

FIGS. 5A-5C illustrate a Tamper Switch Assembly that comprises the Lid Switch Actuator of FIGS. 3A-3C and the Lid Switch Guard Bracket of FIGS. 4A-4B in accordance with some embodiments;

FIGS. 8A-8C show various configuration states of the Tamper Switch Assembly during a lid installation procedure in accordance with some embodiments.

DETAILED DESCRIPTION

FIG. 1 illustrates a rack mount unit 10, which, among other internal mechanical and electrical components, includes a chassis lid 100 (hereinafter "lid) and a chassis 200. The lid 100 and chassis 200 when securely coupled together protect internal electronic and cryptographic devices located thereunder. The lid 100 serves as the protective top of the unit 10, and the chassis 200 provides protective front, bottom, side and back panels. The lid 100 and chassis 200 include the associated electronic and security mechanisms of one or more Tamper Switch Assemblies 110 and one or more Pin Bracket Assemblies 120. The Pin Bracket Assemblies 110 lock down the lid onto the chassis. The Tamper Switch Assemblies 120 detect if the lid has been opened or tampered, and will accordingly report a security violation. These security mechanisms may be located anywhere along the lid 100 and chassis 200 and are not limited to the areas shown.

The chassis 200 and lid 100 when configured as a securely closed rack mount unit 10 with the associated electronic and security mechanisms above, and further described ahead, satisfies certain passive and active security requirements. For instance, the unit 10: i) protects against physical access to internal elements for the purpose of defeating anti tamper elements, ii) protects against electromagnetic access to internal elements for the purpose of side channel analysis, iii) protects against access to the internal elements for the purpose of inserting additional electronics within the product, and iv) provides electronic logging for purpose of providing evidence of tamper events.

Figure 2A:
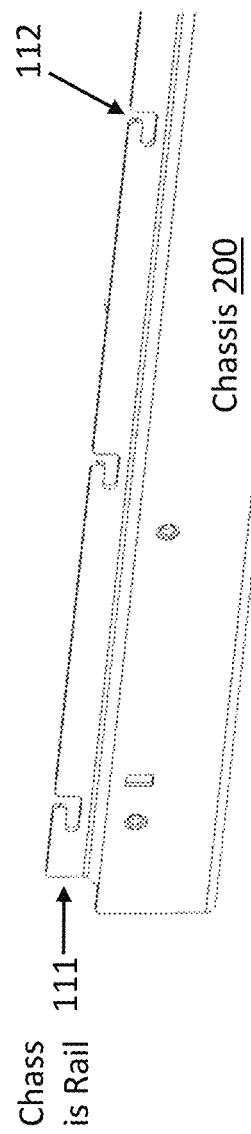
FIGS. 2A-2B illustrate a pin bracket assembly constituting one of the security mechanisms of FIG. 1 in accordance with some embodiments.
Figure 2B:
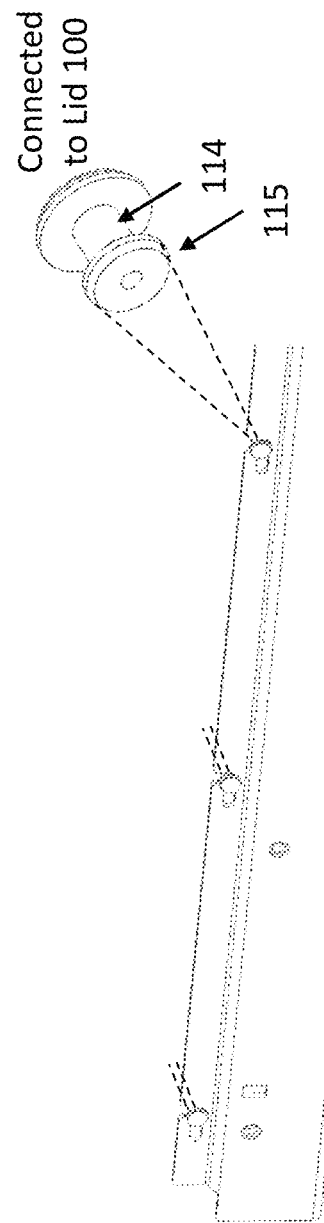

FIGS. 2A and 2B together illustrate the two components constituting the pin-bracket security mechanism of the Pin Bracket Assembly 110 involved in securing the lid 100 (see FIG. 1) to the chassis 200 (see FIG. 1) and keeping the lid 100 and chassis 200 securely engaged thereafter. FIG. 2A shows an exemplary receiving bracket 112 designed along a chassis rail 111 of the chassis 200. The bracket 112 is the first of the two components of the pin-bracket security mechanism constituting the Pin Bracket Assembly 120. In the embodiment illustrated, it resembles the shape of a rotated "L", though other slide shapes are contemplated. FIG. 2B shows the second component, namely, an exemplary pin 114 extending from (or connected from within) the lid 100 that inserts into and slides along the receiving bracket 112. The pin 114 includes a pin head 115 which is slightly larger than the diameter of the pin 114 to provide closer coupling and so as to prevent the pin 114 from slipping out, or being pulled out. Understandably, one or more pins 114 spaced along the side of the lid each insert and secure into the one or more "L" style receiving brackets 112.

The placement of the lid 100 (see FIG. 1) onto the chassis 200 (see FIG. 1) to engage the security mechanisms of the Pin Bracket Assembly 110 shown in FIGS. 2A-2B is termed an installation procedure. When the lid 100 is placed down, the one or more pins 114 lower into the bracket 112. Then when the lid 100 is slid forward to the front, the one or more pins 114 slide into and underneath the bracket 112, thereby preventing the lid 100 from being pried open. Each Pin Bracket Assembly 110 comprises 1) the receiving bracket 112 that is designed and built into the chassis rail 111 and 2) the pin 114 that is designed and built into the lid 100. When the lid 100 is placed down and slid forward to the front of the chassis 200, the pins 114 drop down and slide under the overhang of each receiving bracket 112. In this manner, upon installation of the lid 100, the lid 100 is locked down onto the chassis 200.

Figure 3A:
FIGS. 3A-3C illustrate a Lid Switch Actuator of a Tamper Switch Assembly constituting one of the security mechanisms of FIG. 1 in accordance with some embodiments.
Figure 3C:
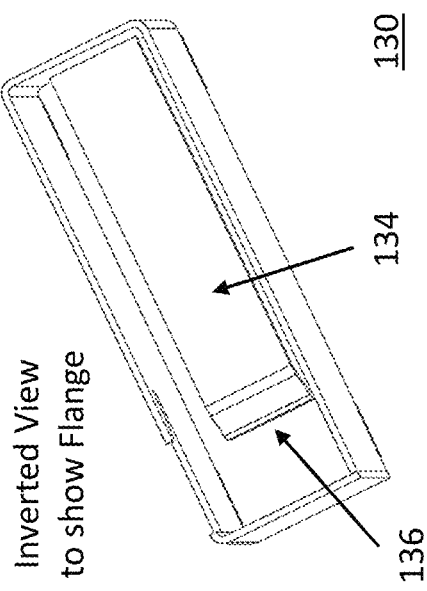
Figure 3B:
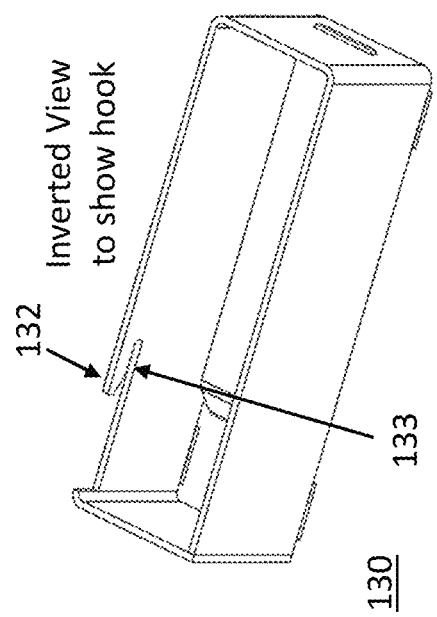

FIG. 3A shows a side view of the lid 100 and two identical and corresponding Lid Switch Actuator(s) 130 associated with a respective Tamper Switch Assembly 120. The Lid Switch Actuator 130 is attached on the underneath side of the lid 100. It is the upper component of the Tamper Switch Assembly 120. The Lid Switch Actuator 130 is mounted to the underside of the lid 100 during manufacture and thereafter remains fixed. (The lower component of the Tamper Switch Assembly 120 is called a Lid Switch Guard Bracket 140 and is shown ahead in FIG. 4A.) As FIG. 3B illustrates, each Lid Switch Actuator 130 includes a hook 132 component and a receiving slot 133. The hook 132 is slightly angled so as to receive a tab element 142 of a Lid Switch Guard Bracket 140 shown in FIG. 4A. As shown in FIG. 3C, each Lid Switch Actuator 130 also includes a flange 134. The flange 134 is a flared steel tongue that remains level even when force is applied along the flared portion 136, as explained ahead.

Figure 4A:
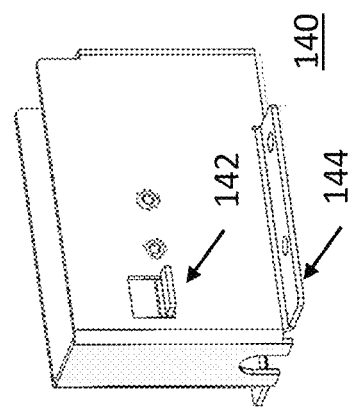
FIGS. 4A-4B illustrate a Lid Switch Guard Bracket of a Tamper Switch Assembly that comprises another one of the security mechanisms of FIG. 1 in accordance with some embodiments.
Figure 4B:
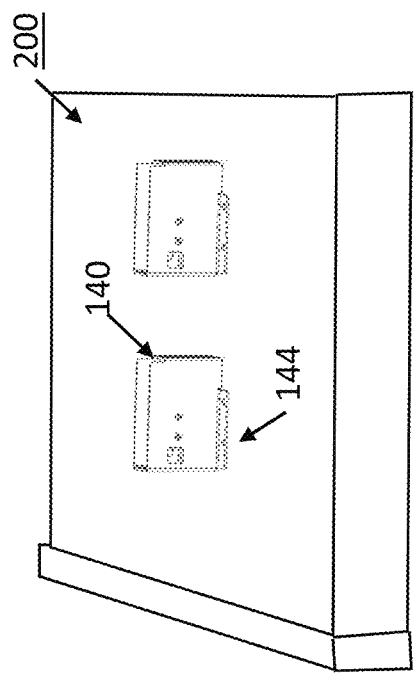

FIG. 4A shows an exemplary Lid Switch Guard Bracket 140, which is the lower component of the Tamper Switch Assembly 120. The Lid Switch Guard Bracket 140 includes a base portion 144 for mounting to the inside bottom of the chassis 200 (shown in FIG. 4B). Referring now to FIG. 4B, the Lid Switch Guard Bracket 140 is mounted to the chassis 200 during manufacture and thereafter remains fixed as illustrated. Understandably, it's placement is not limited to that location shown and may be placed anywhere therein to optimize placement of other components (e.g., circuit boards, electronics, power supplies, sensors, etc.) The Lid Switch Guard Bracket 140 includes a protruding tab 142 required for secure locking of the lid to the chassis and commencing tamper activation, as explained ahead.

Figure 5B:
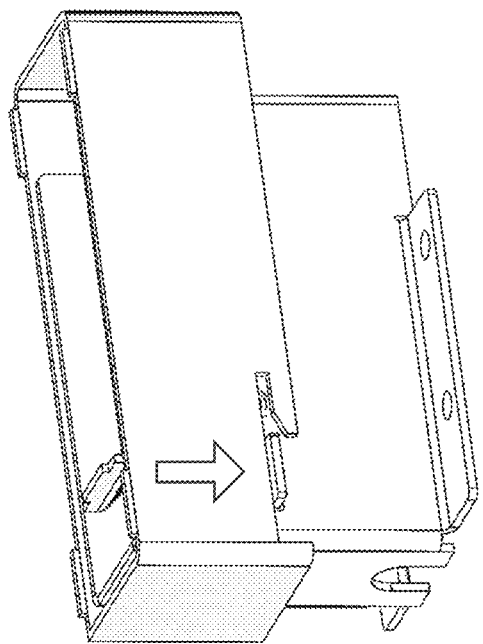

FIG. 5A shows the assembly of the upper component (Lid Switch Actuator 130) and lower component (Lid Switch Guard Bracket 140) of the Tamper Switch Assembly 120. FIG. 5A together with FIG. 5B and FIG. 5C illustrate how the Tamper Switch Assembly 120 functions together during a lid installation. Briefly, the method of lid installation is part of a manufacturing process that involves, aligning the lid 100 to the chassis 200, pushing the lid down, and then sliding the lid forward. The lid 100 is installed onto the chassis 200 during manufacture before the device is powered on, and once in place, the rack mount unit 10 is then powered on to activate secure monitoring for any tampering with the lid 100 and chassis 200. The lid 100 and chassis 200 are not shown for better illustrating the mechanics of the assembly during this lid installation. Accordingly, please keep in mind that the Lid Switch Actuator 130 is affixed to the lid 100, and the Lid Switch Guard Bracket 140 is affixed to the chassis 200. Thus, the lid installation procedure described above serves to couple the Lid Switch Actuator 130 and Lid Switch Guard Bracket 140 of the Tamper Switch Assembly 120 occurs by way of the lid being installed onto the chassis.

Figure 6:
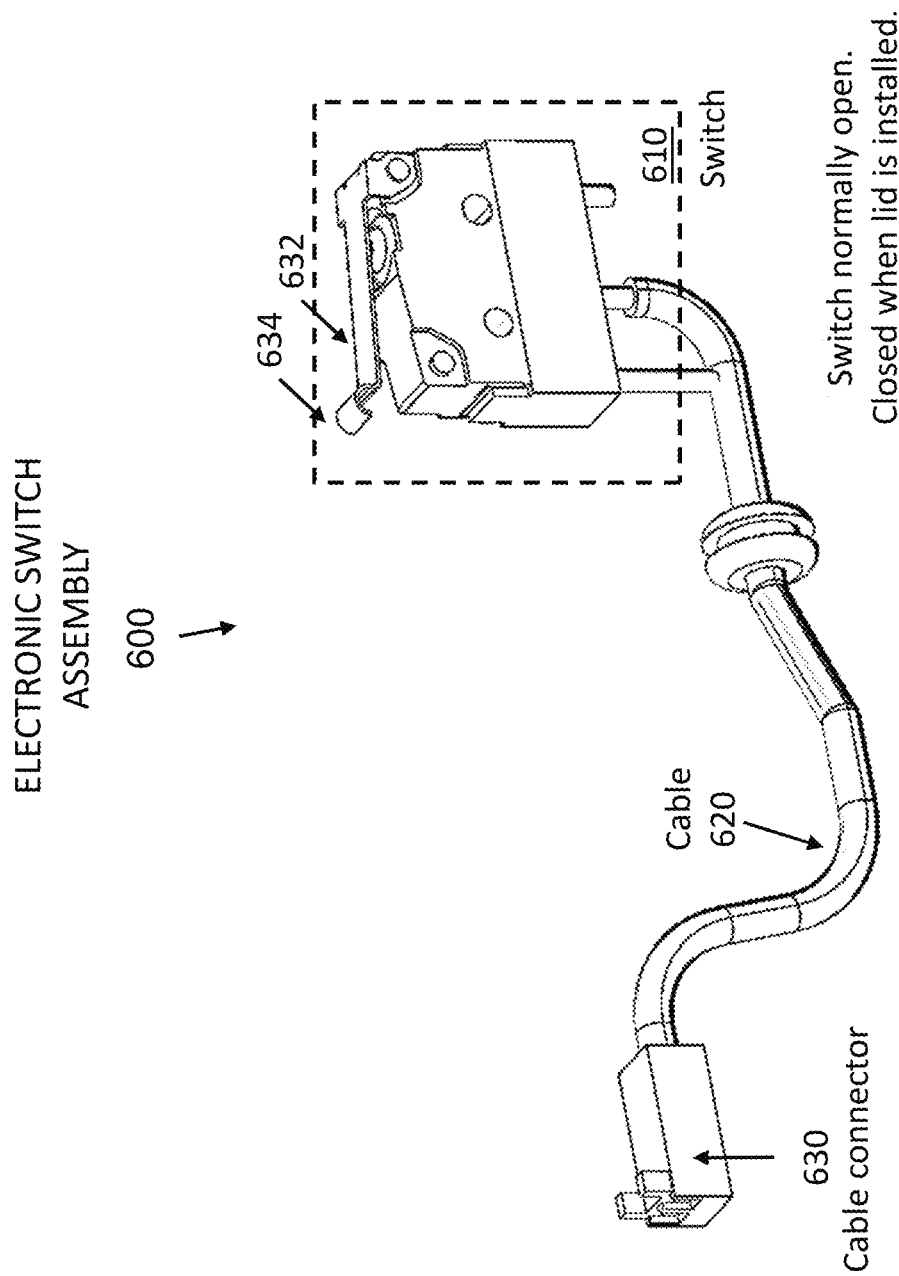
FIG. 6 illustrates an Electronic Switch Assembly in accordance with some embodiments.
Figure 7A:
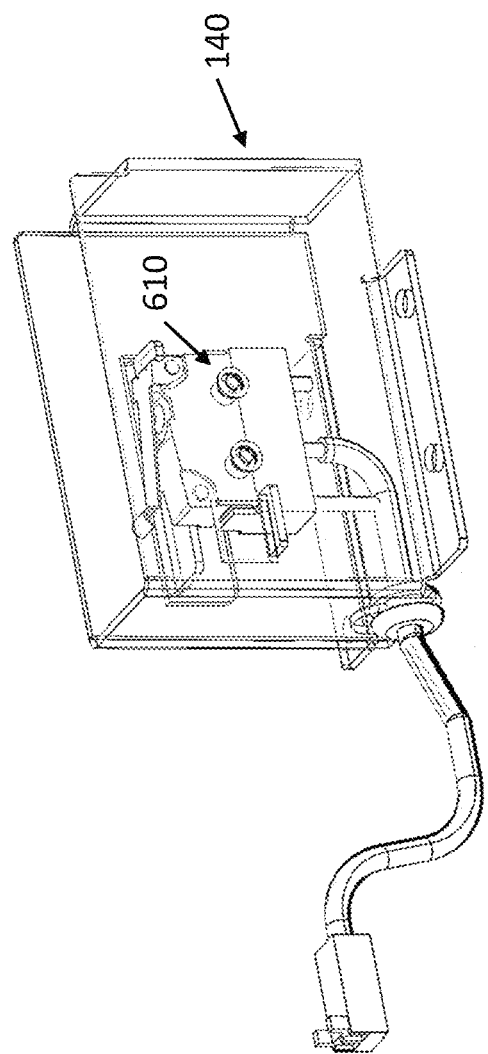
FIG. 7A-7B show the Electronic Switch Assembly of FIG. 6 for inclusion within the Lid Switch Guard Bracket of FIGS. 4A-4B in accordance with some embodiments.
Figure 7B:
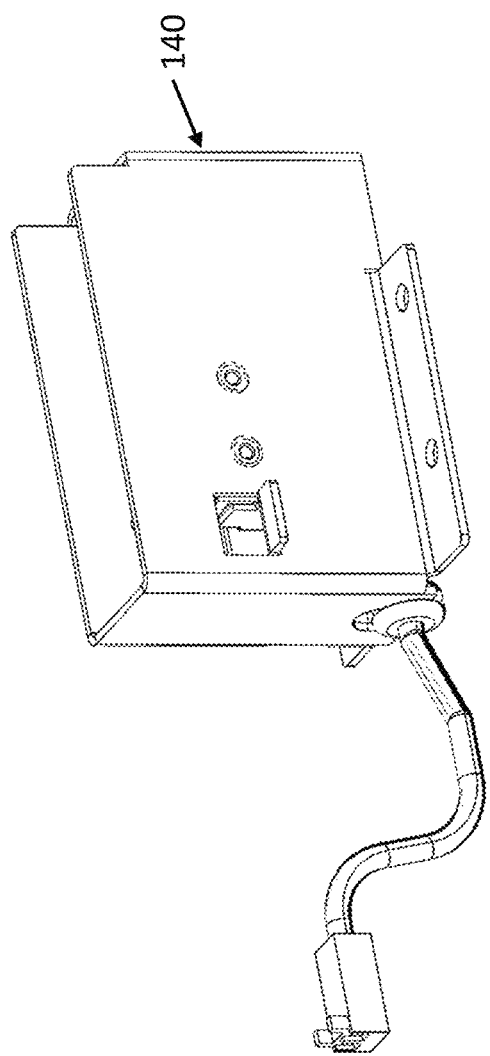

FIG. 6 shows an Electronic Switch Assembly 600 that comprises a switch 610, a cable 620 and a cable connector 630. The cable 620 includes two internal wires that are either connected or disconnected depending on the position of the switch 610. The default position of the switch 610 is the open position, that is, the switch lever 632 is in the up positon. In the open position the switch does not connect the two internal wires. An electrical signal will not pass through the wires through the cable connector 630. When, the lever head 634 is pushed down, the switch closes. In the closed position, the wires are connected (shorted together), and an electrical signal will pass through the wires through the cable connector 630. The cable connector 630 is attachable to a PCB board for electrical coupling. In this manner, a security processor or other micro processor that supports general processing input/output (GPIO) can monitor the switch for continuity to determine its state, and in response, as explained ahead, can determine whether a tamper even occurs. FIG. 7A and FIG. 7B together show how the Electronic Switch Assembly 600 is internally coupled and fits into the Lid Switch Guard Bracket 140.

Figure 8B:
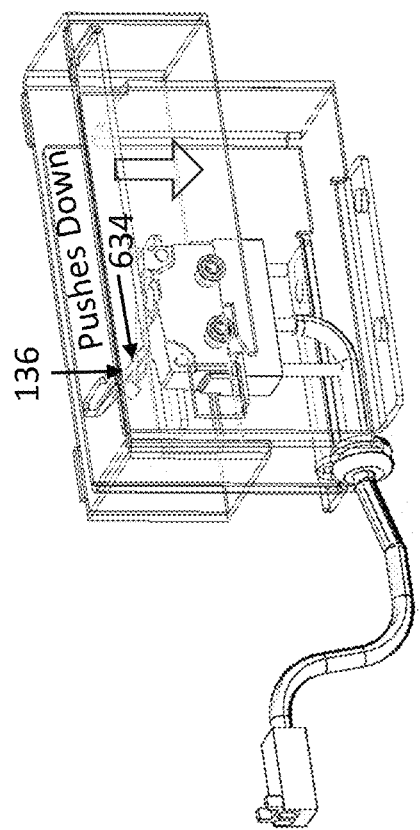
Figure 8C:
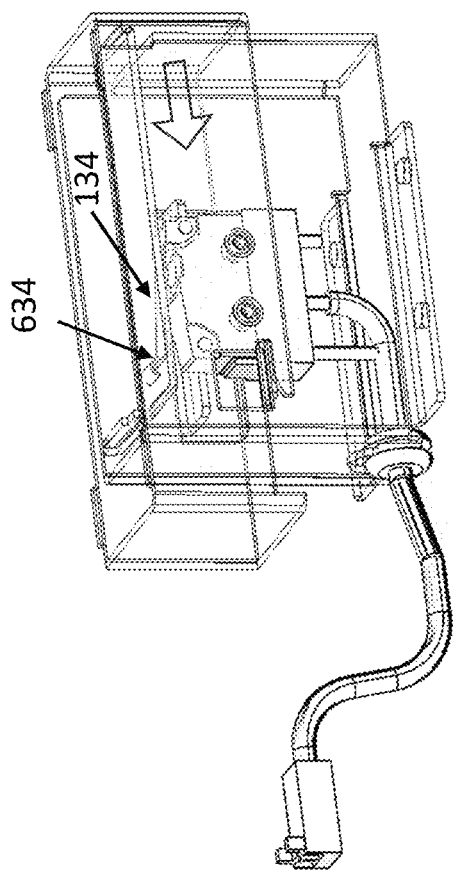

FIG. 8A-8C show the configuration states of the Tamper Switch Assembly 120 during the lid installation procedure. The configuration states are align, push and slide. Recall, the engaging components of the Tamper Switch Assembly 120 comprise the Lid Switch Actuator 130, the Lid Switch Guard Bracket 140, and the Electronic Switch Assembly 600.

FIG. 8A shows alignment of the Lid Switch Actuator 130 and the Lid Switch Guard Bracket 140. In this state, the switch 610 is "open" because there is no downward force of the flared portion 134 of the flange onto the lever head 634 of the switch 600. In FIG. 8B, as the lid 100 (see FIG. 1) is pushed down onto the chassis 200 (see FIG. 1) the respective Lid Switch Actuator 130 on the lid 100 will be similarly pushed down onto the Lid Switch Guard Bracket 140 of the chassis 200. During this transition state, the switch 610 starts in an UP position but will begin to push DOWN because of the downward force of the flared portion 134 of the flange onto the lever head 634 of the switch 610. Then, as shown in FIG. 8C, when the lid 100 is slid forward onto the chassis, the respective Lid Switch Actuator 130 on the lid 100 will similarly slide over the Lid Switch Guard Bracket 140, thereby causing the flange 134 to continually press down on the lever head 634 of the switch and thus keeping the switch 610 in a "closed" position.

Figure 9:
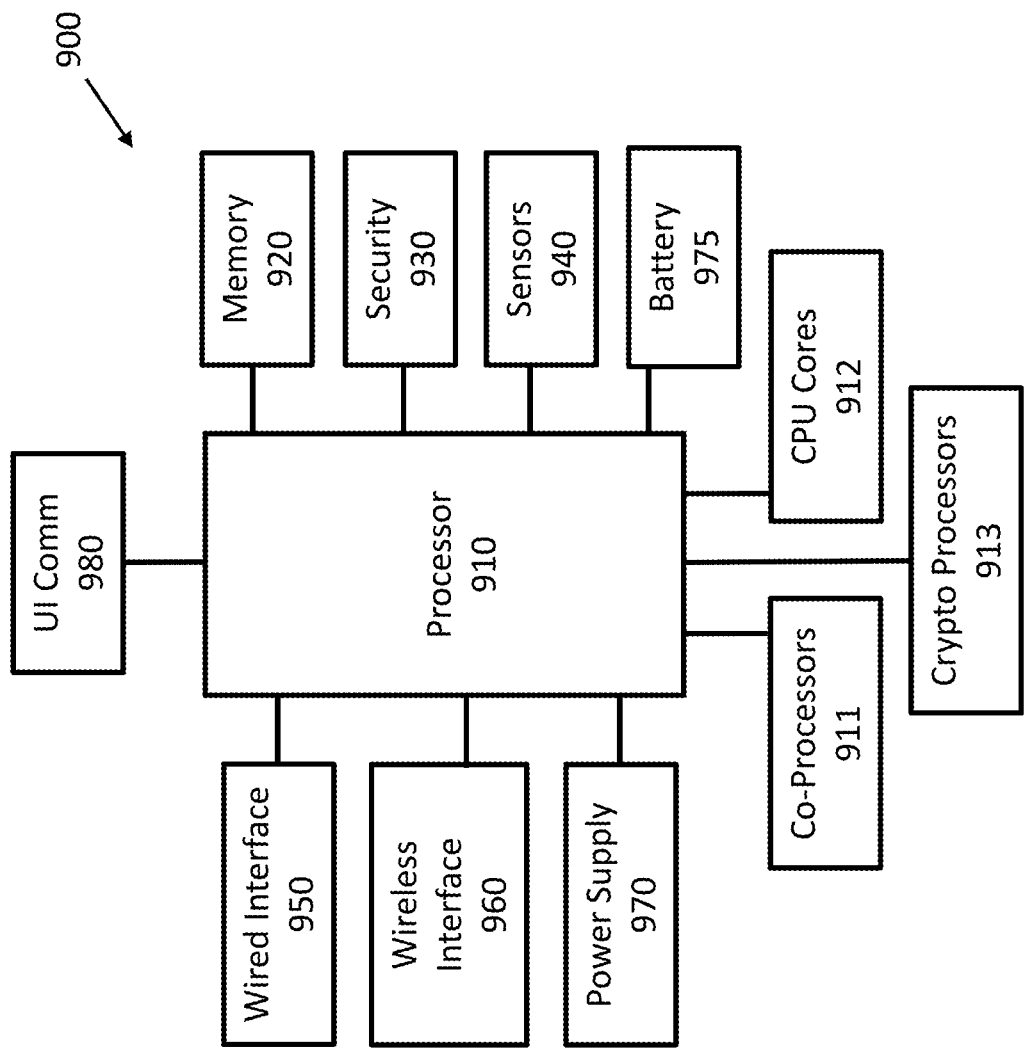
FIG. 9 illustrate illustrates a hardware platform suitable for use with the Tamper Switch Assembly of FIG. 5 in accordance with some embodiments.

FIG. 9 illustrates a hardware platform 900 suitable for use with the Tamper Switch Assembly 120 in accordance with one embodiment. The platform 900 includes a processor 910, a memory 920, and a security circuit 930, sensors 240, a wired communication interface 950, a wireless communication interface 960, a power supply 970 and a battery 975. These components may be communicatively coupled as shown or by direct hardware interfaces there between, including, but not limited to electronics, circuits, wires, lines, logic, or gates, where suitable.

The processor 910 may include one or more data processing circuits, such as a general purpose and/or special purpose processor, such as a microprocessor and/or digital signal processor (e.g., GPU, uP, ASIC, DSP, CPLD, IC, etc.). The processor 910 is configured to execute computer program code in the memory 920, described below as a non-transitory computer readable medium, to perform at least some of the operations described herein as being performed by an identified component, module or software block. The computer program code can include computer instructions, assembly code, firmware, or embedded code, machine code, that when executed by the processor 910 causes the processor 910 to perform operations in accordance with one or more embodiments disclosed herein.

Specific examples (a non-exhaustive list) of the non-transitory computer readable storage medium exemplified by memory 920 can include the following: a hard disk, a random access memory (RAM), a read-only memory (ROM), an erasable programmable read-only memory (EPROM), Flash memory (NAND, NOR), a solid state device (SSD), an optical storage device, a magnetic storage device, or any suitable combination of the foregoing.

The processor 910 may also be communicatively attached to a co-processor 911 (on-board or off board), one or more CPU cores 912 and one or more crypto processors 913 (e.g., HW crypto accelerator) that assist in off-loading computational or processing tasks.

The sensors 940 can detect or measure a physical property and record, indicate, or otherwise responds to the sensory information. The sensors 940 provide for measurement of any one or more of temperature, humidity, radio frequency, electromagnetic, light, force, pressure, acceleration, movement, position, tilt, and other physical interaction and environmental conditions. The Sensors 940 may further include a signal comparator, a phase comparator, an analog to digital converter, amplifier, signal filter, etc. used to enable the processor 910 to receive and process signals from one or more sensors.

The security module 930 provides for monitoring of security violations, security risks, unauthorized uses and attacks on the platform 900. It may be a mixed signal low-power microcontroller that include decision logic, memory or software and that communicatively couples to the sensors 940 and the processor 910. The security module 930 may include software and logic, or share resources and responsibilities with the processor 910, to detect security events, such as tamper levels, thresholds, and conditions.

The platform 900 may include a wired network communication interface 950 and/or a wireless interface 960, for example, a radio access communication transceiver. The wired network interface can include standard computer networking interfaces used in local area networks (LAN), wide area networks (WAN), over the Cloud, and the Internet and other frame based or packed based networks. The Ethernet interface can use TCP/IP and UDP protocols for 10/100/1000 Mbps transmission over standard Cat 5, Cat 5e, or Cat 6 cables. The radio access communication transceiver can include, but is not limited to, a LTE or other cellular transceiver, WLAN transceiver (IEEE 802.11), WiMAX transceiver, Bluetooth transceiver, NFC transceiver, Radio Frequency Identification (RFID) or other radio communication transceiver configured to communicate directly or indirectly (e.g., via a radio access node) with a network node.

The platform 900 may include User Interface (UI) communication (COMM) modules 980, for example, electronic data exchange or generic communication, such as Universal Serial Bus (USB), RS-232 serial port, smart card reader, Graphical User Interfaces (GUI), Light Emitting Diodes (LED), or other user related I/O interfaces.

The power supply 970 provides power to the electronic components of platform 900 and can include regulators and converters to provide required voltage and current requirements. The battery 975 can also provide power, for example, in low-power modes or when otherwise required for security reasons, for example, to maintain the contents of protected memory.

Example Embodiment

Briefly referring back to FIG. 6, the cable connector 630 of the Tamper Switch Assembly 120 may be coupled directly to the processor 910 or security module 930 of FIG. 9 to monitor the switch 610 state. It may also be directly coupled through another intermediary Printed Circuit Board (PCB), for example, a front panel PCB or a power PCB to a main PCB that supports the hardware platform and components shown in FIG. 9. In one arrangement, the security module 930 can be a microprocessor that supports general processing input/output (GPIO). One or more GPIO lines can be communicatively coupled from the security module 930 to the cable connector 630 to inject a continuous signal. The signal can may simply be a level (logic high or low) signal, or a more complex signal, such as an amplitude or frequency modulated waveform. The security module may be interrupt based, for example, triggering on a change in the electrical state (logic high or low) responsive to the movement of the components of the Tamper Switch Assembly 120. In a preferred embodiment, the module 930 injects a known electrical signal out of a GPIO pin to the cable connector 630. The module 930 thereafter monitors the switch for continuity of the electrical signal to determine its state (open or closed) to determine whether a tamper even occurs. When the lid is opened, the switch 610 opens and disconnects the electrical connection to the GPIO line of the module 930. While the lid is closed, the switch remains closed and the electrical connection to the GPIO line of the module 930 remains continuous.

In such an exemplary embodiment, a Tamper Switch Assembly is provided to protect cryptographic modules and electronic components within a closeable rack mount unit, that by way of an installation procedure that closes a lid on the chassis of the closeable rack mount unit, configures the closeable rack mount unit for active tamper monitoring as an engaged and securely closed unit. The Tamper Switch Assembly comprises a Lid Switch Actuator affixed to an underside of the lid of the closeable unit, a Lid Switch Guard Bracket affixed within a chassis of the closeable unit, and an Electronic Switch Assembly insert within the Lid Switch Guard Bracket. The Electronic Switch Assembly comprises a switch, a cable and a cable connector, and further comprises a microprocessor communicatively coupled to the cable connector. The processor monitors the switch for electrical continuity to determine a state thereof, and in response, determine at a later time whether a tamper event occurs on the lid and chassis of the engaged and securely closed unit.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. A non-transitory computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS) and Security as a Service (SECaas).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A Tamper Switch Assembly to protect cryptographic modules and electronic components within a closeable unit, the Tamper Switch Assembly comprising:
- a Lid Switch Guard Bracket affixed to a chassis of the closeable unit;
- an Electronic Switch Assembly inserted within the Lid Switch Guard Bracket; and a Lid Switch Actuator affixed to an underside of a lid of the closeable unit, the Lid Switch Actuator operationally engaged with the Electronic Switch Assembly when the lid of the closeable unit is closed,
- wherein the Electronic Switch Assembly is configured to, when operationally engaged with the Lid Switch Actuator, perform active tamper monitoring thereby configuring a securely closed unit,
- wherein the Lid Switch Actuator comprises a hook and a receiving slot adjacent the hook, and wherein the hook is angled to receive a protruding tab of the Lid Switch Guard Bracket wherein the protruding tab slides into the receiving slot during closing of the lid on the chassis,
- where the Lid Switch Guard Bracket comprises:
  - a base portion configured to mount the Lid Switch Guard Bracket to an inside bottom of the chassis, and
  - the protruding tab configured to operationally engage the hook to secure locking of the lid to the chassis to commence tamper activation,
- where the Electronic Switch Assembly comprises a switch, a cable and a cable connector, and further comprising a microprocessor coupled to the cable connector and configured to monitor the switch for electrical continuity to determine a state of the switch, and in response, determine whether a tamper event occurs on the lid or chassis of the securely closed unit,
- where the Lid Switch Actuator includes a flange with a flared portion and is configured to slide over the Lid Switch Guard Bracket wherein the flange presses down on a lever head of the switch to keep the switch in a closed position when the Lid Switch Actuator has been slid over the Lid Switch Guard Bracket.

2. A method of operating a Tamper Switch Assembly to protect cryptographic modules and electronic components within a closeable unit, the method comprising:
- providing a Lid Switch Actuator affixed to a surface of a lid of the closeable unit;
- providing a Lid Switch Guard Bracket affixed to a chassis of the closeable unit;
- providing an Electronic Switch Assembly within the Lid Switch Guard Bracket; and responsive to the lid being closed on the chassis of the closeable unit by the Lid Switch Actuator being moved toward and overlapping the Lid Switch Guard Bracket and being slid forward to engage the Electronic Switch Assembly while the lid is being closed, providing active tamper monitoring of the Electronic Switch Assembly to thereby provide a securely closed unit responsive to the lid being closed,
- wherein providing the Lid Switch Actuator comprises providing a hook and a receiving slot adjacent the hook, wherein responsive to closing of the lid on the chassis, the hook receives a protruding tab of the Lid Switch Guard Bracket wherein the protruding tab slides into the receiving slot during the closing of the lid on the chassis,
- wherein providing the Lid Switch Guard Bracket comprises:
  - providing a base portion to mount the Lid Switch Guard Bracket to an inside bottom of the chassis, and providing the protruding tab to secure locking of the lid to the chassis to commence tamper activation,
- wherein providing the Electronic Switch Assembly comprises providing a switch, a cable and a cable connector, and further comprising providing a microprocessor communicatively coupled to the cable connector to monitor the switch for electrical continuity to determine its state, and in response, determine whether a tamper event occurs on the lid and chassis of the securely closed unit,
- wherein responsive to the lid being pushed down and slid forward, the Lid Switch Actuator includes a flange with a flared portion on the lid and slides over the Lid Switch Guard Bracket, whereby the flange continually presses down on a lever head of the switch to keep the switch in a closed position.

3. A Tamper Switch Assembly to protect cryptographic modules and electronic components within a closeable rack mount unit, the Tamper Switch Assembly comprising:
- a Lid Switch Guard Bracket affixed within a chassis of the closeable rack mount unit;
- an Electronic Switch Assembly inserted within the Lid Switch Guard Bracket; and
- a Lid Switch Actuator affixed to an underside of a lid of the closeable rack mount unit and configured to operationally engage the Electronic Switch Assembly when the lid of the closeable rack mount unit is closed,
- wherein the Electronic Switch Assembly is configured to perform active tamper monitoring when operationally engaged with the Lid Switch Actuator,
- wherein the Electronic Switch Assembly comprises a switch, a cable and a cable connector, and, further comprising a microprocessor communicatively coupled to the cable connector to monitor the switch for electrical continuity to determine a state thereof, and in response, determine, based on the electrical continuity, whether a tamper event occurs on the lid and chassis of the closeable rack mount unit when the closeable rack mount unit is closed,
- wherein the Lid Switch Actuator includes a flange and wherein responsive to the lid being pushed down and slid forward, the Lid Switch Actuator on the lid slides over the Lid Switch Guard Bracket, whereby the flange continually presses down on a lever head of the switch to keep the switch in a closed position.

* * * * *